Nov. 15, 1938.　　　　　D. GRANT　　　　　2,136,739

APPARATUS FOR MAKING LAMINATED WRAPPING PAPERS

Filed Aug. 11, 1937　　　2 Sheets-Sheet 1

INVENTOR
D. GRANT
BY J. D. O'Connell
ATTORNEY

Nov. 15, 1938.    D. GRANT    2,136,739
APPARATUS FOR MAKING LAMINATED WRAPPING PAPERS
Filed Aug. 11, 1937    2 Sheets-Sheet 2
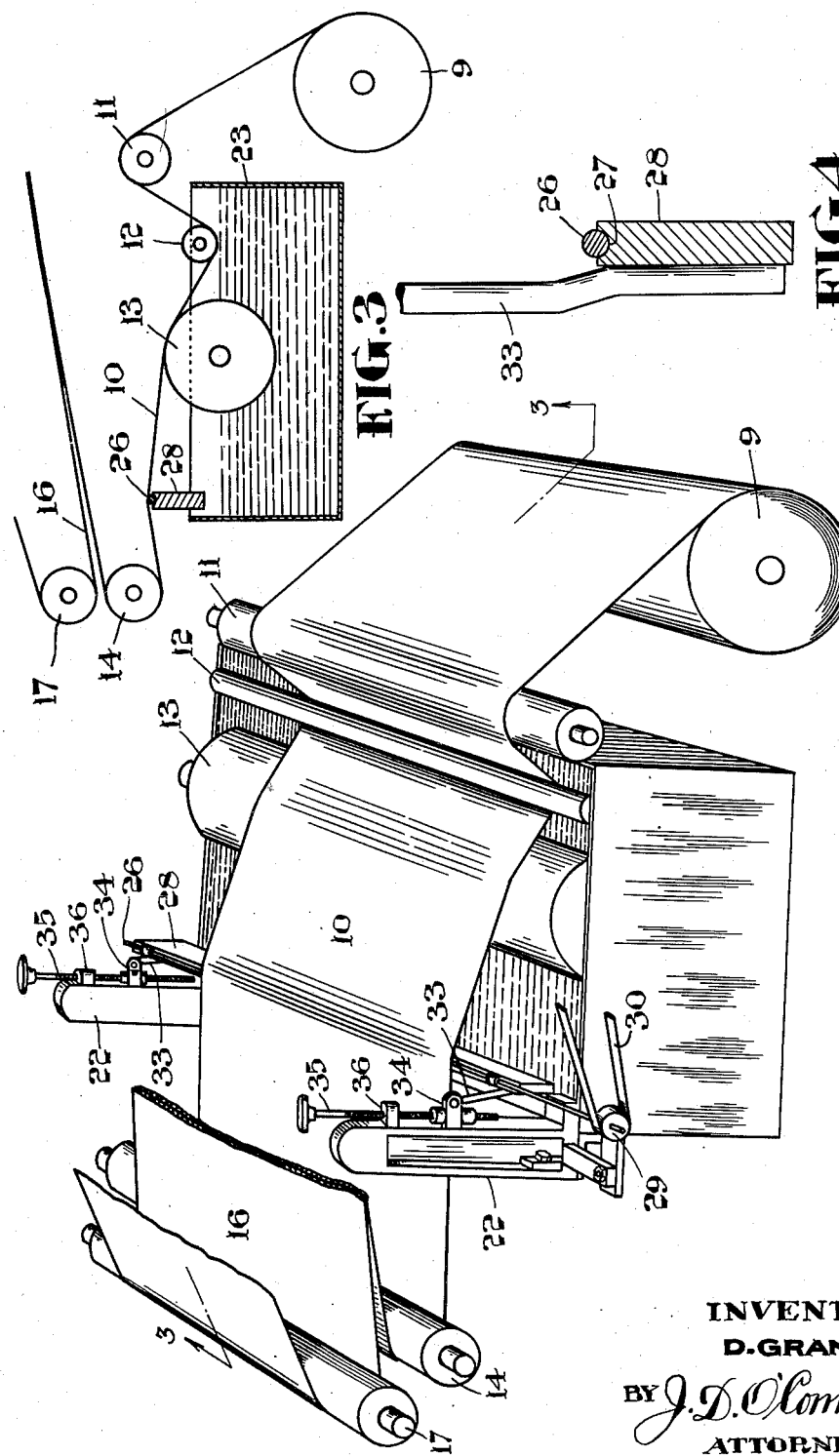
INVENTOR
D. GRANT
BY J. D. O'Connell
ATTORNEY Patented Nov. 15, 1938

2,136,739

UNITED STATES PATENT OFFICE 2,136,739

APPARATUS FOR MAKING LAMINATED WRAPPING PAPERS

Dallas Grant, Windsor Mills, Quebec, Canada, assignor to Canada Paper Company, Montreal, Quebec, Canada, a corporation of Canada Application August 11, 1937, Serial No. 158,549
In Canada June 24, 1937

4 Claims. (Cl. 154—37)

REISSUED

JUL 7 1942

This invention relates to improved apparatus for making laminated wrapping papers and other laminated paper products in which the adjacent plies or sheets are bonded together by an interposed layer or film of asphalt.

The principal object of this invention is to ensure a more even and uniform distribution of the asphalt coating which is applied to one or more of the paper sheets as they pass to the laminating press. This object is achieved by causing the asphalt coated surface of each coated sheet to pass over a cylindrical doctor rotating in a direction opposite to the travel of the sheet. The rotary doctor is arranged so that it may be adjusted to regulate the thickness of the asphalt coating on the sheet passing thereover in addition to ensuring uniform distribution of the asphalt over the width of the sheet. The doctor is also mounted to rotate in close proximity with a stationary scraper by which asphalt is continuously removed from the doctor and returned to the asphalt vat in which both the doctor and the scraper are mounted. The more even and uniform distribution of the asphalt coating which is obtained with the use of the rotary doctor also enables a satisfactory laminated product to be obtained with a thinner film of asphalt between the component sheets or plies than is ordinarily considered necessary.

Another object of the present invention is to prevent sticking of the adjacent convolutions of the roll which is formed by the winder to which the laminated product is delivered as it passes from the laminating press. This object is achieved by the provision of cooling rolls over which the laminated product is passed from the laminating press to the winder. These rolls are maintained at a temperature low enough to ensure that the asphalt bond between the adjacent layers or plies of the laminated product will be sufficiently cooled and solidified to prevent the aforesaid sticking during the winding operation.

Proceeding now to a more detailed description of this invention, reference will be had to the accompanying drawings in which:

Figure 2 is an enlarged perspective view of the asphalt coating and distributing equipment.

Figure 3 is a sectional view on a reduced scale of a portion of the equipment shown in Figure 2, the plane of the section being substantially along the line 3—3 of Fig. 2.

Figure 4 is an enlarged sectional detail view showing the assembly of the rotary doctor and the associated scraper.

Figure 1:
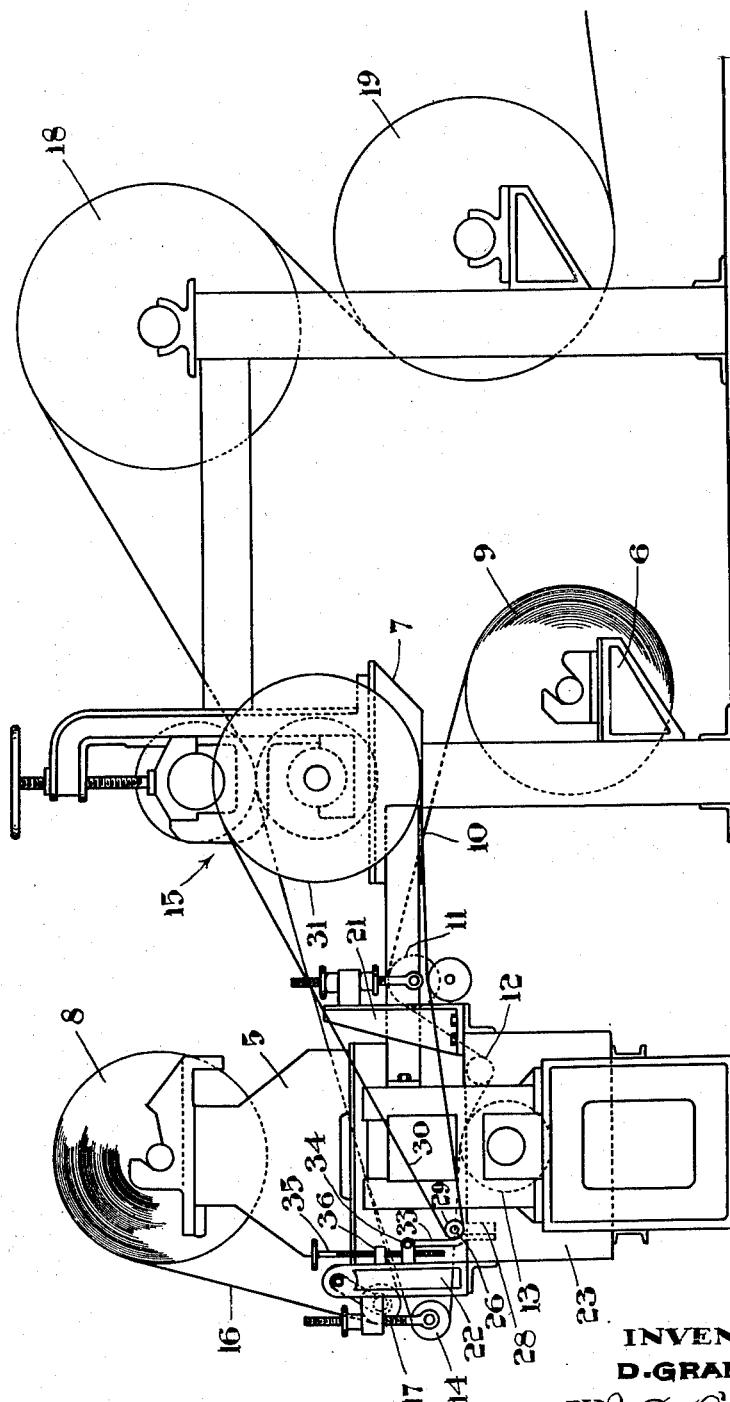
Figure 1 is a diagrammatic side elevation of one form of apparatus by which the invention may be reduced to practice.

In these drawings I have shown my invention embodied in apparatus designed to produce a laminated paper product comprising two paper sheets or webs bonded together by an interposed layer or film of asphalt. This is merely by way of example since it is obvious that the invention may be embodied in apparatus designed to produce laminated products consisting of three or more paper sheets or plies bonded together by interposed layers or films of asphalt. It is also pointed out that the invention may be embodied in apparatus designed to produce reinforced laminated paper products, that is to say, paper products in which reinforced strings, fibres or other elements are laid between the adjacent sheets or plies.

Referring more particularly to the drawings, 5 and 6 designate upper and lower roll stands mounted on a suitable frame structure 7. These stands carry upper and lower paper rolls indicated at 8 and 9. The sheet 10, supplied by roll 9, is passed around guide rolls 11 and 12 to the coating roll 13 and from thence around a further guide roll 14 to the laminating press 15 where the coated side of sheet 10 is bonded to the underside of a second sheet or web 16 drawn from the roll 8. As it travels from roll 8 to press 15 the sheet 15 is passed around a guide roll 17 located above but slightly to the right of the guide roll 14.

From the press 15 the laminated product formed by the asphalt united sheets 10 and 16 passes over upper and lower cooling rolls 18 and 19 which are maintained at a sufficiently low temperature to ensure that the asphalt will be sufficiently cooled during its passage over said rolls to prevent sticking of the component plies of the shipping roll which is formed by the winder (not shown) to which the laminated product is passed from the lower cooling roll 19.

The guide rolls 11 and 14 over which the sheet 10 is guided to and from the coating roll 13 are supported from the brackets 21 and 22 mounted at opposite sides of the asphalt vat 23 containing the coating roll 13. The guide roll 12 is mounted in the vat 23 and rides the upper surface of sheet 10 to ensure satisfactory contact between the lower surface of the sheet and the coating roll 13. The ends of the guide roll 17 around which the sheet 16 is passed are carried by the lower ends of a pair of swinging arms 25 having their upper ends pivoted to the brackets 22.

The main feature of the present invention resides in the provision of a rotary doctor 26 over which the coated side of the sheet 10 is passed as it leaves the coating roll 13. This doctor comprises a smooth cylindrical rod rotatably mounted in a curved or semi-circular groove 27 formed in the upper edge of a vertically disposed scraper 28. It is driven in a direction opposite to the travel of the sheet 10 by means of the pulley 29, belt 30, and pulley 31. The scraper 28 is adjustably supported in the vat 23 to permit the doctor 26 to be raised and lowered to regulate the thickness of the asphalt coating which is left on the sheet 10 as it passes from the doctor to the press 15. In this connection it will be noted that the scraper is fixed to the lower ends of a pair of supporting arms 33 having their upper ends fastened to suitable fittings 34 carried by adjusting screws 35. The screws 35 are threaded through lugs 36 carried by the brackets 22 so that, by turning these screws in the proper direction, the scraper 28 and doctor 26 may be raised or lowered with reference to the coated surface of the sheet 10.

It is important that the doctor 26 be provided with a perfectly smooth cylindrical surface since this gives the best results with respect to ensuring uniform distribution of the asphalt over the coated side of the sheet 10. The asphalt picked up by the cylindrical surface of the doctor is continuously removed therefrom by the scraper 28 and drop back into a vat 23.

Having thus described my invention, what I claim is:—

1. Apparatus for use in the manufacture of laminated paper products comprising means for applying a coating of asphalt to one side of a travelling web of paper, a cylindrical rod over which the coated side of the web travels as it leaves the coating means, means for continuously rotating said rod in a direction opposite to the travel of said web, means for raising and lowering the rod to regulate the thickness of the coating left on the web as it passes beyond said rod, means for removing asphalt from the coating-engaging surface of said rod and means for pressing a second travelling web of paper against the coated side of the first web after the latter has passed over said rod.

2. Apparatus for use in the manufacture of laminated paper products comprising means for applying a coating of asphalt to one side of a travelling web of paper, a cylindrical rod over which the coated side of the web is passed as it leaves the coating means, means for continuously rotating said rod in a direction opposite to the travel of the engaging portion of said web, means for removing asphalt from the coating-engaging surface of said rod, means for pressing a second travelling web of paper against the coated side of the first web after the latter has passed over said rod and cooling rolls over which the resulting laminated product is passed from the pressing means.

3. Apparatus for use in the manufacture of laminated paper products comprising means for applying a coating of asphalt to one side of a travelling web of paper, a cylindrical rod over which the coated side of the web is passed as it leaves the coating means, means for continuously rotating said rod in a direction opposite to the travel of the engaging portion of the web, a scraper arranged to continuously remove asphalt from the coating-engaging surface of said rod, means for effecting unitary vertical adjustment of the rod and scraper with reference to the coated side of the web to regulate the thickness of the coating left on the web after it is passed over the rod and means for pressing a second travelling web of paper against the coated side of the first web as the latter travels beyond said rod.

4. Apparatus for use in the manufacture of laminated paper products comprising means for applying a coating of asphalt to one side of a travelling web of paper, a cylindrical rod over which the coated side of the web travels as it leaves the coating means, means for continuously rotating said rod in a direction opposite to the travel of said web, means for removing asphalt from the coating engaging surface of said rod and means for pressing a second travelling web of paper against the coated side of the first web after the latter has passed over said rod.

DALLAS GRANT.